US005554463A

United States Patent [19]

Marincic et al.

[11] Patent Number: 5,554,463
[45] Date of Patent: Sep. 10, 1996

[54] CURRENT COLLECTOR HAVING COINED SIDE EDGES FOR USE IN AN ELECTROCHEMICAL CELL, AND METHOD OF ITS PRODUCTION

[75] Inventors: Nikola Marincic, Winchester; Luka Rabadjija, Newton, both of Mass.

[73] Assignee: Pacesetter, Inc., Sylmar, Calif.

[21] Appl. No.: 459,683

[22] Filed: Jun. 2, 1995

(Under 37 CFR 1.47)

[51] Int. Cl.$^6$ ........................................... H01M 2/20
[52] U.S. Cl. ................. 429/233; 429/129; 429/131; 429/237; 429/241; 429/242
[58] Field of Search .................... 429/233, 241, 429/242, 233, 241, 242, 209, 237, 129, 131, 122

[56] References Cited

U.S. PATENT DOCUMENTS 3,907,593  9/1975  Marincic .
4,865,933  9/1989  Blanyer et al. .................... 429/241

Primary Examiner—Prince Willis, Jr.
Assistant Examiner—M. Nuzzolillo
Attorney, Agent, or Firm—Harold C. Schloss; Malcolm J. Romano

[57] ABSTRACT

An expanded screen current collector is provided with side edges coined inwardly to prevent sharp tines formed along the side edges from damaging adjacent components within the electrochemical cell. The expanded screen current collector is formed by cutting a thin flat sheet of current collector material, such as titanium or stainless steel, to have a height somewhat greater than a height required for use within the electrochemical cell. The current collector material is cut and expanded, then the side edges are coined inwardly by an amount sufficient to reduce the height of the resulting expanded screen current collector to a height appropriate for use within the electrochemical cell. An active cathode material, such as polycarbonmonoflouride, is coated onto side surfaces of the expanded screen current collector. An electrode structure employing the expanded screen current collector having the coined edges is also described. The improved expanded screen current collector is employed within an electrochemical cell adapted for use within an implantable device.

10 Claims, 1 Drawing Sheet

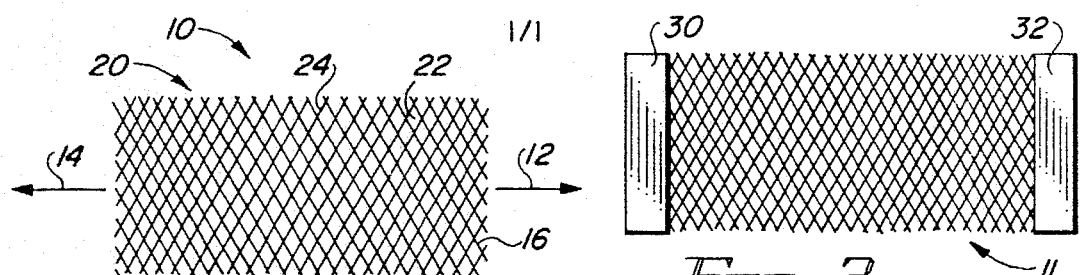
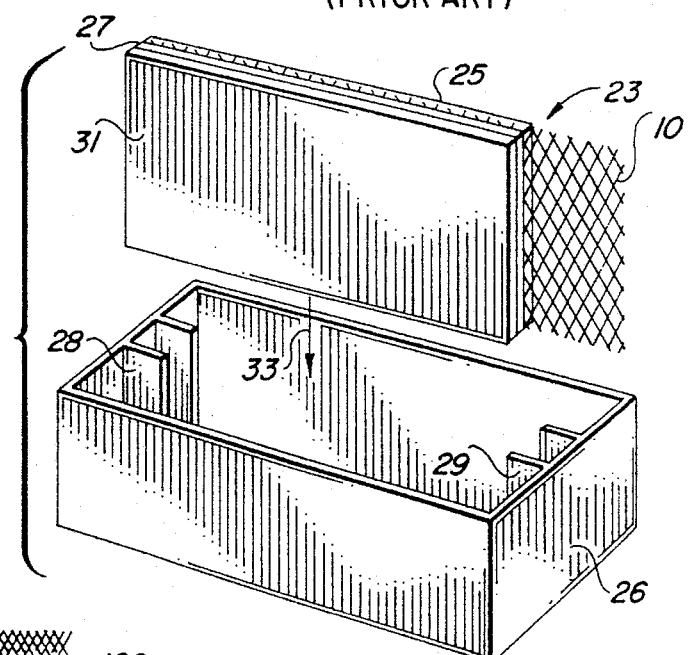
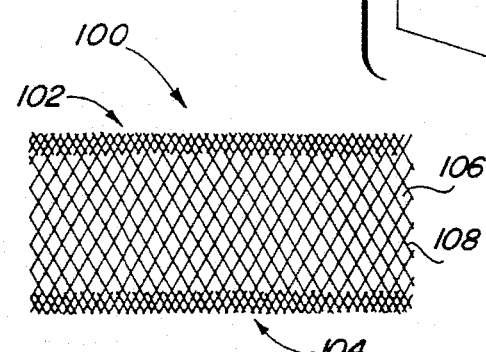
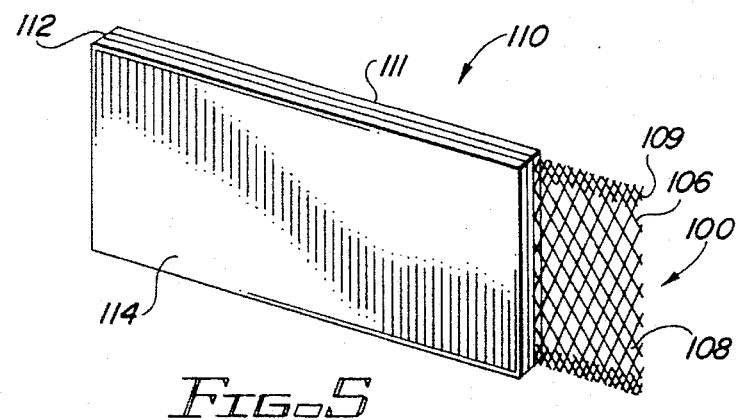

CURRENT COLLECTOR HAVING COINED SIDE EDGES FOR USE IN AN ELECTROCHEMICAL CELL, AND METHOD OF ITS PRODUCTION

BACKGROUND OF THE INVENTION

1. Field of the Invention

The invention generally relates to electrochemical cells for use in powering implantable devices and in particular to an improved expanded screen current collector for use within an electrochemical cell.

2. Description of the Related Art

The surgical implantation of electronic devices in humans and animals has become a commonplace occurrence. Such devices are used for a wide range of purposes within the body. The most commonly known of such devices is the cardiac pacemaker. Other well-known implantable devices are employed for stimulating or sensing, or both, with respect to the brain, spinal cord, muscles, bones, nerves, glands, or other body organs or tissues.

Implantable devices are becoming more and more complex and commonly include sophisticated data processing hardware such as microprocessors, or related devices, ROM and RAM memories, LSI (Large Scale Integration) devices as well as other computer hardware. In many cases, information is transmitted to and from the implantable device to external monitoring equipment and such information may include device identification, biological data, parameters of present operation of the device (from previous settings), technical information concerning proper functioning of the device, patient and physician data, up-to-date programming for the device and verification of information transmitted to and from the device.

With more and more data being processed and available within the implantable device, there is a need to transmit more and more data from the implanted device to external devices for analysis, reprogramming of the implantable device, or for other purposes.

As a result of the increase sophistication of implantable devices and particularly due to the increased amount of data required to be transmitted from the device, the need to provide improved power sources for the implantable devices has increased greatly. There are, of course, limitations on the design of power cells for use in implantable devices, especially with regards to the size and shape thereof. Furthermore, the power supplies must be highly reliable and be capable of providing an adequate amount of current and voltage for an extended period of time.

One type of power supply for use in an implantable device is an electrochemical cell, particularly one employing lithium as an anode material. Typically, within such cells, a metal foil anode coated with lithium is provided in combination with a porous carbon cathode formed on a current collector, with a polymeric separator positioned between the anode and cathode. The electrode structure is mounted within a housing which is at least partially filled with a liquid electrolyte. It is desirable for the current collector to be configured to allow for a large amount of cathode material to be formed thereon while also achieving adequate electrical contact to all portions of the cathode material.

One commonly employed current collector configuration is an expanded screen wherein a flat, thin sheet of electrically conducting material, such as stainless steel, titanium or aluminum, is partially cut in numerous places along a direction extending between opposing side edges. Thereafter, the current collector material is pulled or stretched along a direction perpendicular to the cutting direction to expand the collector material and thereby yield a structure having a substantial surface area for receiving cathode material.

FIG. 1 illustrates a conventional expanded screen current collector 10. Arrows 12 and 14 indicate the direction along which the material is pulled or stretched to achieve the expanded configuration as illustrated. The current collector 10 includes numerous individual strings 16 extending generally from a bottom side edge 18 to a top side edge 20. Numerous openings 22 exist between adjacent strings 16. The openings 22 result from the expansion of the partial cuts formed in the current collector material. As can be seen from FIG. 1, the strings 16 project outwardly along the side edges 18 and 20 yielding sharp tines or projections 24. The sharp tines 24 often become bent during handling of the current collector.

An electrode structure employing the expanded screen current collector is illustrated in FIG. 2. The electrode structure 23 is formed by applying an appropriate amount of a cathode material 25 onto the expanded screen current collector 10 which is then mounted to one side of a polymeric separator 27. An anode 31 is mounted to an opposing side surface of the separator 27. Within FIG. 2, for clarity in illustrating the current collector 10, a portion of the electrode structure 23 is shown without the anode, separator and cathode materials. In actual electrodes, the current collector is completely covered by the cathode material and the anode and separator extend along an entire length of the current collector.

The sharp tines 24 of the current collector 10, if bent, can damage the polymeric separator 27 and can further cause a short circuit directly between the anode 31 and the cathode 25, thereby degrading and perhaps completely preventing performance of a resulting electrochemical cell.

FIG. 2 also illustrates an electrochemical cell housing 26 into which the electrode structure 23 is inserted. An arrow 33 illustrates a direction of insertion. During insertion, end portions of the electrode structure 23 are mounted within slots 28 and 29. (Only one exemplary set of slots are illustrated. An actual electrochemical cell will typically have many slots mounted in parallel.)

It has been found that damage caused by the sharp tines 24 is particularly severe within the vicinity of the slots 28 and 29.

To partially minimize the risk of damage, some expanded screen current collectors are formed as shown in FIG. 3 wherein only a central portion of an expanded screen current collector 11 is cut and expanded. Opposing end portions 30 and 32 are left unexpanded. The overall length of the expanded screen current collector, and of end portions 30 and 32, is selected to match the distance between opposing slots within a housing such as the one shown in FIG. 3. When the electrode structure is mounted within the housing, the end portions 30 and 32 are thereby properly received within the slots.

Hence, those portions of the expanded screen current collector which are mounted within the slots of the cell housing do not include any sharp tines and potential damage to the electrode structure in the vicinity of the slots is avoided. However, damage may still occur as a result of sharp tines formed along the expanded portions of the current collector. Moreover, because of the presence of the unexpanded end portions of the current collector, the resulting electrode structure can only be effectively employed within an electrochemical cell having a slot spacing matching the length of the electrode structure. Such a current collector can not be formed from an arbitrarily sized sheet, then cut to fit any of a number of predetermined slot spacings, as can be done for the expanded current collectors of the type illustrated in FIG. 1. Rather, once the expanded screen current collector of FIG. 3 is formed, it cannot be significantly cut in length to fit an arbitrary slot spacing but is useful only in an electrochemical cell having a slot spacing substantially matching the un-cut current collector length.

The foregoing problems which result from the presence of the sharp tines is particularly severe for electrochemical cells requiring very thin expanded screen current collectors. For thicker electrodes, such as electrodes having a thickness greater than 0.035 inches, any resulting sharp tines are usually sufficiently rigid to resist bending. Subsequent damage, if any, to the adjacent polymeric separator is thereby minimal. However, for certain electrochemical cells, an expanded screen current collector having such a thickness does not allow for a cell to be formed having an adequate geometrical surface area of current collector material. Such is a particular problem in small electrochemical cells for use in implantable devices which must be small in size. To provide a greater geometrical surface area and thereby improve the overall performance of such cells, it is desirable to employ a current collector having a thickness less than 0.035 inches, and in particular less than 0.025 inches. By employing thinner current collectors, a greater geometrical surface area is achieved without requiring a corresponding increase in the overall volume of the current collector.

However, for current collectors having a width less than 0.025 inches, particularly less than 0.020 inches, the aforementioned damage caused by the presence of the sharp tines is particularly problematic. With such a width, the resulting tines are considerably less rigid than in thicker current collectors, thus allowing the tines to be accidentally bent during fabrication or mounting in a manner which may damage the polymeric separator and perhaps cause a short circuit to the anode. It has been found that such problems are particularly severe when employing current collectors formed of stainless steel or titanium in part because such materials cannot be sufficiently annealed to conform to shape changes during assembly. The fabrication of cells incorporating thin current collectors formed of aluminum has been somewhat more successful, yet the overall performance of the resulting cells is generally unacceptable because aluminum does not provide the degree of current collection that can be achieved using titanium or stainless steel.

Many of the aforementioned problems occur for woven current collectors as well as for expanded screen current collectors.

It would be desirable to provide an improved method for fabricating expanded screen current collectors and woven current collectors for use in electrochemical cells, particularly those employed in implantable devices, wherein the aforementioned problems are substantially avoided. In particular, it would be desirable to provide a method for fabricating a current collector having a thickness less than 0.025 inches, yet formed of titanium or stainless steel, in a manner such that the current collector can be reliably employed within an electrochemical cell.

SUMMARY OF THE INVENTION

In accordance with one aspect of the invention an improvement is provided for current collectors for use within electrochemical cells of implantable devices. The improvement comprises coining opposing side edges of the current collector inwardly. The invention may be advantageously applied to expanded screen current collectors and to woven current collectors, as well as to any other current collectors having sharp tines extending from opposing side edges.

In an exemplary embodiment, the current collector having the coined side edges is an expanded screen current collector used within an electrode structure having a flat sheet anode separated from the expanded screen current collector by a polymeric separator material. The expanded screen current collector is formed from a sheet of stainless steel or titanium having a width less than 0.025 inches. The current collector is coated with polycarbonmonoflouride. The flat sheet anode is a thin metal foil coated with lithium.

The expanded screen current collector having coined edges may be formed by first providing a sheet of metal, such as stainless steel or titanium, having a width somewhat greater than a desired width for use in an electrochemical cell. The sheet of metal is partially cut, in accordance with conventional techniques, in numerous places along a direction between opposing side edges, then expanded by pulling outwardly on opposing ends of the sheet. Thereafter, the opposing side edges are bent or coined inwardly by an amount sufficient to assure that the resulting width of the current collector matches the desired width for use in the electrochemical cell. Finally, the length of the current collector is cut to match the length available between slots within a desired cell housing.

By employing a current collector having coined opposing side edges, damage which may result from sharp tines along those edges is substantially avoided. In particular, damage that would otherwise occur to the polymeric separator, perhaps resulting in a short-circuit to the anode material, is avoided. The current collector can be formed to an arbitrary length, then cut to fit the slot spacings of any particular electrochemical cell housing.

Hence, the general objectives set forth above are achieved. Other objects and advantages of the invention will be apparent from the descriptions provided herein.

BRIEF DESCRIPTION OF THE DRAWINGS

FIG. 1 is a side elevational side view of an expanded screen current collector formed in accordance with the prior art.

FIG. 2 is a perspective view of an electrode structure employing an expanded screen current collector and a portion of an electrochemical cell housing, particularly illustrating the location of slots within the housing into which the electrode structure is mounted.

FIG. 3 is a side elevational view of an expanded screen current collector having non-expanded ends.

FIG. 4 is a side elevational view of an expanded screen current collector configured in accordance with the invention.

FIG. 5 is a perspective view of a portion of an electrode structure incorporating the expanded screen current collector of FIG. 4.

DETAILED DESCRIPTION OF THE INVENTION

The invention relates to an improved current collector for use in an electrochemical cell for providing power within an implantable device. The invention will be described primarily with reference to a lithium battery cell but is applicable to other electrochemical cells as well.

Referring to FIGS. 4 and 5, exemplary embodiments of the invention will now be described. Referring first to FIG. 4, an expanded screen current collector 100 is illustrated wherein top and bottom side edges 102 and 104, respectively, are coined or bent inwardly as shown.

The expanded screen current collector 100 is formed from a flat sheet of metal, such as titanium or stainless steel, cut and expanded to form openings 106 between strings 108 which extend generally from the bottom edge 104 to the top edge 102. The fabrication of the original flat sheet material and the cutting and expansion thereof may be primarily in accordance with conventional techniques which will not be described in detail herein. One difference, however, is that the initial flat sheet material is formed to have a height (between uncoined side edges 102 and 104) somewhat greater than the height that would be used for a conventional expanded screen current collector. A sheet having greater height is employed such that, after coining, the height of the coined current collector matches the height of the selected cell housing.

Opposing side edges of the slot sheet material are bent or coined inwardly (By "inwardly" it is meant that the top side edge 102 is bent downwardly and the bottom side edge 104 is bent upwardly.) The side edges are bent inwardly by an amount sufficient to reduce the height of the expanded screen current collector 100 to that of a conventional collector. The degree to which the side edges are bent inwardly may vary from collector to collector but will generally depend on the length of the projecting tines. Typically, a sufficient portion of the side edges will be bent inwardly to assure that the projecting tines remain flat against the side surface of the current collector. Coining of the side edges may be performed manually or an automated machine may be provided.

The expanded screen current collector 100 is thereafter employed as a component of an electrode structure illustrated in FIG. 5. More specifically, an electrode structure 110 is formed wherein the expanded current collector 100 is coated, on both side faces, with an active cathode material 111. The expanded screen current collector 110 with the cathode material 111 is mounted to a polymeric separator 112. An anode 114 is mounted to any opposing side surface of the polymeric separator 112. For clarity in illustrating the current collector, the structure of FIG. 5 is shown with a portion of the anode, separator and active cathode material cutaway. In actual electrode structures, the collector is completely covered.

In an exemplary embodiment, the expanded screen current collector 100 is formed of titanium. The active cathode material is formed of porous polycarbon monoflouride. The anode is formed of lithium coated onto a thin metal sheet. The electrode structure 110 may be employed within an electrochemical cell housing of the type illustrated in FIG. 2.

The resulting cell incorporating the electrode structure having the coined-edge expanded screen current collector is preferably employed within an implantable medical device such as a pacemaker or the like which is implanted within a human or animal.

Although not Specifically shown, the invention may also be applied to woven current collectors, rather than expanded screen current collectors. Also, although the drawings illustrate that the entire top and bottom edges of the current collector are coined, in other embodiments, it may be desirable to coin only portions, such as end portions, of the side edges inwardly. Also, it may be desirable to coin different portions of the side edges by different amounts, i.e. a greater portion of side edges may be coined at the extreme ends of the side edges than at the middle of the side edges. In other embodiments, it may be desirable to coin only the top or only the bottom edge. Further, it may be desirable to coin the opposing ends of the current collector as well as, or in the alternative to, the side edges.

What has been described is an improvement for current collectors for use within electrochemical cells of implantable medical devices. Although specific exemplary embodiments of the invention are described herein, principles of the invention may be applied in other applications as well. As such, the examples described herein should not be construed as limiting the scope of the invention.

What is claimed is:

1. In an electrochemical cell for use within an implantable device, wherein the cell includes an electrode structure having an expanded screen current collector, and wherein said improvement comprises:

coining at least a portion of opposing side edges of the current collector inwardly by an amount sufficient to prevent any sharp portions occurring along the side edges from extending outwardly.

2. The electrochemical cell as defined in claim 1, wherein the current collector is formed from a material selected from a group consisting of stainless steel, titanium and aluminum.

3. The electrochemical cell as defined in claim 1, wherein the electrode structure comprises an anode, a polymeric separator separating said anode from said current collector, and an active cathode material coating said current collector.

4. The electrochemical cell as defined in claim 3, wherein said anode includes lithium and said active cathode material includes polycarbonmonoflouride.

5. An electrode structure for use in an electrochemical cell for powering an implantable device, said structure comprising:

an expanded screen current collector having sharp tines along opposing side edges and having a cathode material mounted thereon; and a separator material adjoining said anode and said current collector;

wherein at least a portion of said side edges of said current collector are coined inwardly.

6. The electrode structure as defined in claim 5, wherein the current collector is formed from a material selected from the group consisting of titanium, stainless steel and aluminum.

7. The electrode structure as defined in claim 5, wherein the anode includes lithium and the cathode material includes polycarbonmonoflouride.

8. A method for fabricating a current collector for use in an electrochemical cell for powering an implantable device, wherein the cell requires a current collector of a predetermined height, said method comprising the steps of:

forming an expanded screen current collector having a height greater than the predetermined height; and coining opposing side edges of the current collector inwardly by amounts sufficient to reduce the height of the current collector to the predetermined height.

9. The method as defined in claim 8, wherein the current collector is formed from a material selected from the group consisting of titanium, stainless steel and aluminum.

10. The method as defined in claim 8 further comprising the steps of:

coating the current collector with an active cathode material;

mounting the current collector with active cathode material onto a side surface of a polymeric separator; and mounting an anode to an opposing side surface of the polymeric separator.

* * * * *